W. R. CALVERT.
HOSE WASHER.
APPLICATION FILED MAY 12, 1914.
1,137,382.
Patented Apr. 27, 1915.
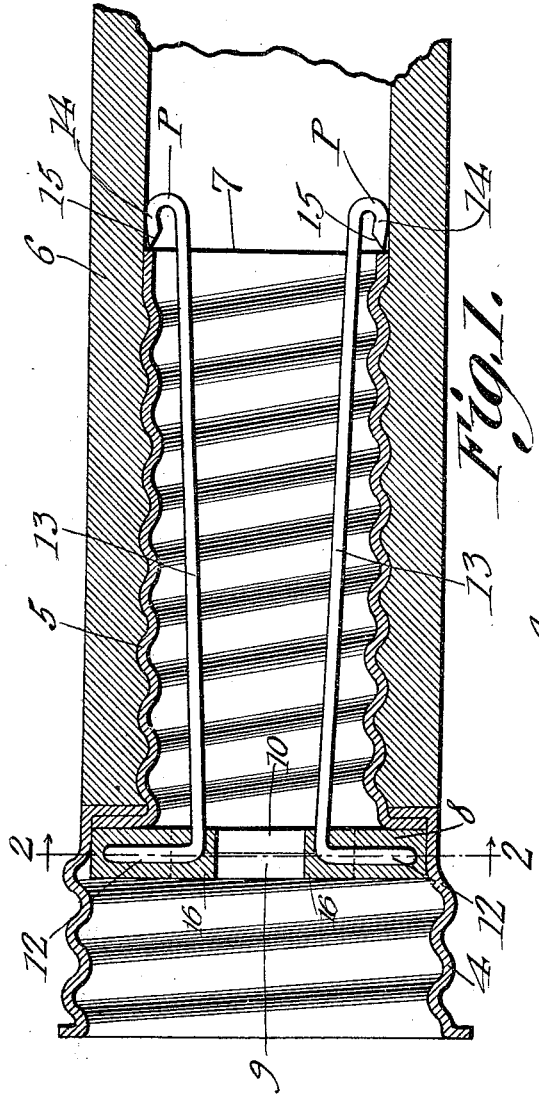
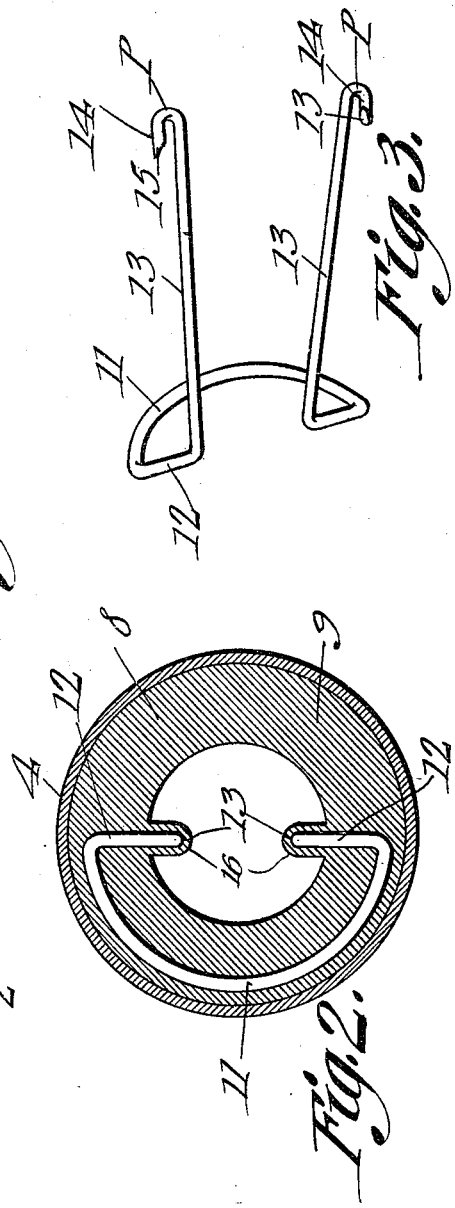

UNITED STATES PATENT OFFICE.

WALTER RILEY CALVERT, OF SAN ANTONIO, TEXAS.

HOSE-WASHER.

1,137,382.   Specification of Letters Patent.   Patented Apr. 27, 1915.

Application filed May 12, 1914. Serial No. 838,084.

*To all whom it may concern:*

Be it known that I, WALTER R. CALVERT, a citizen of the United States, residing at San Antonio, in the county of Bexar and State of Texas, have invented a new and useful Hose-Washer, of which the following is a specification.

This invention relates to improvements in hose washers and more particularly to that class which are provided with means for preventing their accidental detachment or displacement from a hose.

An object of the present invention is to provide a hose washer with novel means for effectively securing the same to the end of a hose.

A further object is to provide a hose washer including a resilient wire retaining member of unique formation for holding the washer in place.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in longitudinal section of the end portion of a hose with the improved hose washer disposed therein and secured thereto. Fig. 2 is a cross sectional view taken on the line 2—2 of Fig. 1. Fig. 3 is a perspective view of the resilient wire attaching element.

In the drawing, there is illustrated a rotatable female or socket member 4 of a hose coupling which is carried by the outer end of a nipple or hose attaching member 5 having the end of the hose 6 engaged thereon. The inner end of the nipple 5 forms a shoulder 7, which is utilized for the engagement of the washer holding or retaining element.

The hose washer, designated 8, is preferably formed of two annular sections 9 and 10 which are vulcanized or otherwise united. The washer, when in position, is disposed within the coupling member 4 against the outer end of the nipple 5 for the contact therewith, of the male coupling member, to provide a tight joint.

The retaining or holding element which is formed from a length of suitable wire, has an intermediate semi-circular portion 11 embedded in one half of the washer, portions 12 projecting inwardly from the ends of the semi-circular portion 11, and complementing resilient arms 13 projecting from the inner ends of the portions 12. The portions 12 project beyond the edge of the aperture or opening of the washer, as seen in Fig. 2, and the arms 13 are under tension for causing them to separate. The arms 13 are provided with the outturned hooks P at their free ends, and the bills 14 of the hooks have their free ends beveled inwardly, as at 15, to provide sharp points which are engageable with the shoulder or inner end 7 of the nipple 5.

The washer 8 is provided with inwardly projecting lugs 16 embracing the inner ends of the portions 12, and the bends between the said portions 12 and arms 13, whereby the said lugs 16 will protect the said bends against corrosion, and will also assist in holding the arms 13 in operative position. In assembling the wire retaining element with the washer, it is preferable to place the portion 11 of the wire element between the sections or layers of the washer or gasket prior to vulcanizing or uniting the same, in order that the portions 11 and 12 of the wire element will be properly embedded in the washer after the vulcanizing operation.

In applying the washer to the hose, the arms 13 are first pressed toward one another so as to readily enter the nipple or sleeve 5, and the hooks P may then readily slide along the opposite sides of the nipple as the washer is forced home within the coupling member 4. When the washer is forced into its proper position, the hooks P will snap over the end or shoulder 7 of the nipple 5, the tips 15 of the hooks engaging the end or shoulder 7 of the nipple 5 in such a manner, as to effectively hold the washer seated within the coupling member 4, and without injuring the hose 6. Due to the formation of the wire retaining element, and the peculiar assemblage of the washer and wire element, the device is thoroughly efficient and practical for the intended purpose.

Having thus fully described my invention, what I claim is:—

In a device of the character described, a washer, and a retaining device therefor embodying a wire having an intermediate semi-circular portion embedded in one half of the washer, portions projecting inwardly from the ends of the said semi-circular portion, and complementing resilient arms projecting from the inner ends of the said inwardly-projecting portions, the arms having outturned hooks at their free ends, and the washer having inwardly projecting lugs embracing the inner ends of the said inwardly-projecting portions and the bends between the said inwardly-projecting portions and arms.

In testimony that I claim the foregoing as my own, I have hereto affixed my signature in the presence of two witnesses.

WALTER RILEY CALVERT.

Witnesses:
E. TOMMINS,
J. C. KIRBY, Jr.

Copies of this patent may be obtained for five cents each, by addressing the "Commissioner of Patents, Washington, D. C."